May 22, 1956 — L. R. ALLISON — 2,747,032

VACUUM TUBE AMPLIFIER CIRCUITS FOR CODED CARRIER CURRENT

Original Filed Feb. 8, 1949

INVENTOR.
Leslie R. Allison.
BY W. L. Stout

HIS ATTORNEY

United States Patent Office 2,747,032

Patented May 22, 1956

2,747,032

VACUUM TUBE AMPLIFIER CIRCUITS FOR CODED CARRIER CURRENT

Leslie R. Allison, Pittsburgh, Pa., assignor to Westinghouse Air Brake Company, Wilmerding, Pa., a corporation of Pennsylvania Original application February 8, 1949, Serial No. 75,188, now Patent No. 2,662,934, dated December 15, 1953. Divided and this application May 22, 1953, Serial No. 356,675

4 Claims. (Cl. 179—171)

Figure 1:
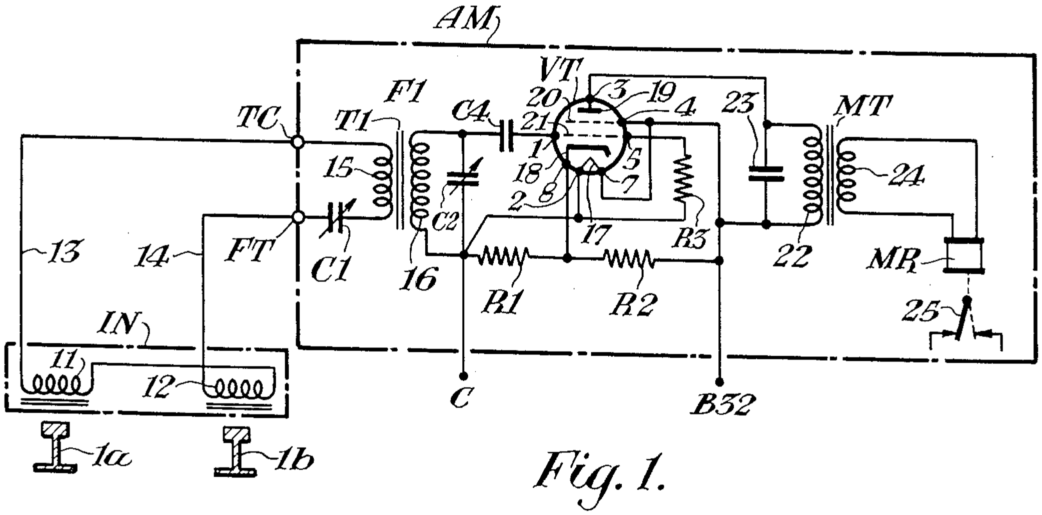

My invention relates to vacuum tube amplifier circuits, and more particularly to vacuum tube amplifier circuits for use with coded carrier current.

The present application is a division of my copending application, Serial No. 75,188, filed February 8, 1949, for Vacuum Tube Amplifier Circuits for Coded Carrier Current, now Patent No. 2,662,934 issued December 15, 1953.

There are many signaling systems which use coded carrier current and for which systems exacting safety requirements are prescribed because the operation must be as nearly one hundred per cent safe as can be reasonably obtained. Also, a failure of the system if it does occur should be on the side of safety. For example, railway cab signal systems in many cases use alternating current which is coded by being periodically interrupted. Ordinarily the alternating current is of a special frequency such as 100 cycles per second and the current is coded at any one of several different code rates each of which code rates reflects a designated traffic condition. In these railway cab signal systems the track rails are arranged in track sections and each track section is provided with a track circuit that includes means for supplying coded alternating current to the rails of the section. Inductors are mounted on the train for inductive relation to the rails to pick up an electromotive force in response to the coded alternating current flowing in the rails. This electromotive force is used to operate a train carried code following relay which in turn governs the cab signals and other train control devices. The electromotive force picked up by the inductors is of a low energy level and an amplifier is interposed between the inductors and the code following relay.

Due to the safety requirements set up for these railway cab signal systems, the amplifier circuits must avoid false operations due to circuit failures or due to failure of energy. In line with these requirements, the amplifier circuits usually include an input filter tuned to resonance at the frequency of the alternating current used so that the apparatus will be immune to extraneous energy picked up by the inductors due to the rails carrying propulsion current and stray alternating currents from commercial power lines and other sources. Furthermore, the amplifier circuits are arranged insofar as it is possible, so that a broken or misplaced circuit element will not result in a false operation of the apparatus to produce a false proceed signal indication. Since an open circuit condition may create an intermittent opening of the circuit due to the vibration of the train, the amplifier circuits should protect against an improper operation of the code following relay due to an intermittent opening of any of the circuits.

Again, in amplifier circuits of the type here contemplated, a given bias voltage for the vacuum tube is preferably used and the safety requirements mentioned above make it necessary to assure that a loss of the bias voltage does not result in a false operation of the apparatus.

In view of the problems encountered due to the safety requirements for signaling systems of the type here involved, a principal object of my invention is the provision of vacuum tube amplifier circuits having improved safety features.

Another object of my invention is the provision of vacuum tube amplifier circuits incorporating novel means to eliminate false operation due to an intermittent open circuit condition.

Again, an object of my invention is the provision of vacuum tube amplifier circuits incorporating a novel and improved automatic bias control means.

Other features, objects and advantages of my invention will appear as the specification progresses.

In practicing my invention I provide a vacuum tube amplifier circuit network that includes an input filter. This filter preferably includes a transformer having tuned primary and secondary windings, the primary winding being adapted to receive the signaling energy and the secondary winding being connected to a control electrode of the vacuum tube. The output of this amplifier circuit network includes a coupling transformer, the primary winding of which is included in the anode circuit of the vacuum tube and the secondary winding of which transformer is connected to a code following relay. Thus, a sharp rise or change in the value of the anode current will induce an impulse of electromotive force in the secondary winding for energizing the relay, the impulse being of one polarity when the anode current rises and being of the reverse polarity when the anode current decreases sharply. The code following relay is a polar relay having its contact member operated to a first and a second position in response to energizing impulses of opposite polarity supplied to the relay.

I provide a vacuum tube that is constructed in such a manner that each end of its control electrode or grid is brought out to an external base pin or terminal so that a circuit may be arranged to have the control grid element and its two terminals in series therewith. That is to say, the vacuum tube is provided with two external terminals which are connected to the opposite ends or at least to two spaced points of the control grid. The control grid and its two terminals in series are included in a circuit which comprises resistive or electrical conductive elements and capacitive elements, the resistive elements being connected to one of the grid elements and the capacitive elements being connected to the other terminal of the control grid. Preferably the secondary winding of the filter transformer is made at least one of the conductive elements of this circuit and a capacitor of the filter is preferably made at least one of the capacitive elements of the circuit. This circuit including the control grid and its two terminals is connected to the cathode of the tube to form a control grid cathode circuit, a bias voltage source being interposed in the circuit adjacent the cathode. This bias voltage source is preferably poled to bias the control grid negative in potential with respect to the cathode by a voltage sufficient to give substantially zero anode current when no signaling energy is received. This control grid cathode circuit is connected to the two terminals of the control grid in such a manner that no portion of the circuit can become open without either the negative bias voltage of the control grid being maintained subsequent to the open circuit condition or the bias voltage being reduced at such a gradual rate subsequent to the open circuit that the anode current builds up so slowly that any impulse induced in the coupling transformer as a result of this building up of the anode current is insufficient to operate the code following relay. In this way an intermittent open circuit in any point of the circuit network would not result in energy impulses being passed to the code following relay for operation thereof.

I shall described two forms of vacuum tube amplifier circuits embodying my invention and shall then point out the novel features thereof in claims.

Figure 2:
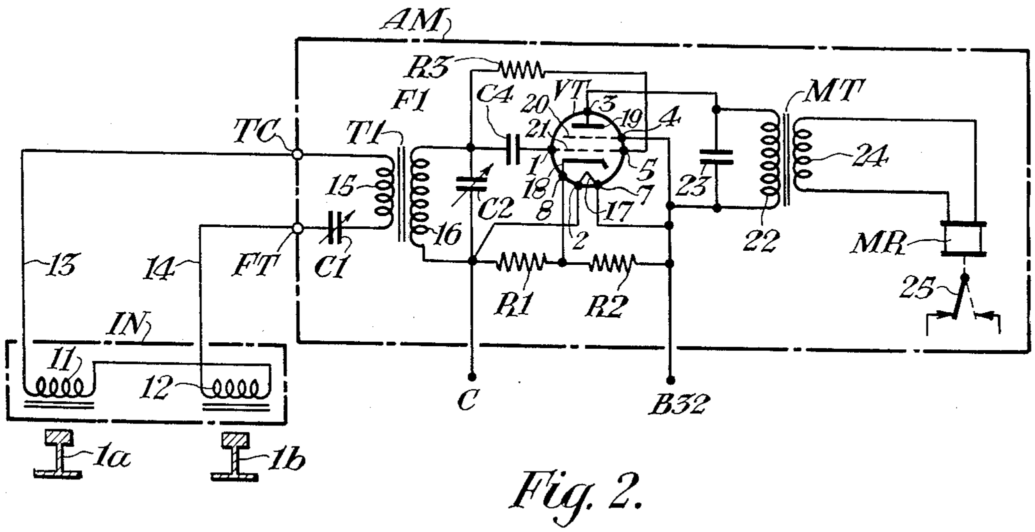

In the accompanying drawings, Fig. 1 is a diagrammatic view showing one form of vacuum tube amplifier embodying my invention, and Fig. 2 is a diagrammatic view showing another form of vacuum tube amplifier embodying my invention.

In each of the two views similar reference characters are used to designate similar parts.

In the drawings the amplifier circuits are illustrated as being used with a railway cab signal system, but it is to be understood that while the vacuum tube amplifier circuits provided by this invention are peculiarly adaptable for use in railway cab signal systems, the circuits are not limited to this one use and there are many other places where the circuits can be used to an advantage.

Wherever the term "vacuum tube" is used in the specification and claims, it is understood to mean a device consisting of an evacuated enclosure containing a number of electrodes between two or more of which conduction of electricity through the vacuum or contained gas may take place. That is, the term vacuum tube is here used cover an electron tube or a gas tube.

Referring to Fig. 1, the reference characters 1*a* and 1*b* designate the track rails of a railway and which rails are formed in the usual manner into track sections. The rails of each section are included in a track circuit, not shown, having a source of alternating current connected across the rails at the exit end of the section. The alternating current is of a designated frequency and is coded at any one of a plurality of different code rates according to different traffic conditions. The trackway apparatus for supplying the coded current to the rails 1*a* and 1*b* is not shown since its specific structure forms no part of my invention and there are several well-known arrangements that can be used. For example, the trackway apparatus may be similar to that disclosed in Letters Patent of the United States No. 1,986,679, granted January 1, 1935, to Lloyd V. Lewis, for Railway Traffic Controlling Apparatus.

As an aid in the understanding of my invention the alternating current supplied to the rails 1*a* and 1*b* will be assumed to have a frequency of 100 cycles per second and as being coded at 180, 120, and 75 interruptions per minute to reflect "clear," "approach medium," and "approach" traffic conditions, respectively. The absence of rail current or the presence of non-coded rail current reflects a "stop" or "slow speed" traffic condition. Thus each code is made up of alternate "on" periods during which current flows in the rails and "off" periods during which no current flows in the rails. It will be understood, however, that my invention is not limited to the above assumed frequency for the alternating current and the above mentioned code rates for the coding thereof.

The train carried apparatus of Fig. 1 includes an inductor IN and an amplifying unit AM.

The inductor unit IN includes two windings 11 and 12 which are mounted on the train in inductive relationship with the rails 1*a* and 1*b*, respectively. Thus an electromotive force is induced in the windings 11 and 12 due to the coded alternating current supplied to the rails in the manner described above. The windings 11 and 12 are connected to add their electromotive forces when current flows in opposite directions in the two track rails 1*a* and 1*b* at any given instance. Consequently the inductors 11 and 12 and the trackway apparatus associated therewith constitute a source of coded carrier current. The windings 11 and 12 of the inductor IN are connected by wires 13 and 14 to input terminals TC and FT of the amplifier unit AM.

The amplifying unit AM comprises a filter F1, a vacuum tube VT, a coupling or master transformer MT, and a code following or master relay MR. The filter F1 comprises capacitors C1 and C2 and a transformer T1 having independent primary and secondary windings 15 and 16, respectively, but an autotransformer may be used. The primary winding 15 of transformer T1 and the capacitor C1 are connected in series across the terminals TC and FT, the parts being proportioned for this circuit to be tuned to series resonance at the frequency of the carrier of the signaling current, which in the case here used for illustration is a current of 100 cycles per second.

The secondary winding 16 and the capacitor C2 are included in the filter F1 in a manner to be more fully discussed hereinafter.

The vacuum tube VT is preferably a high vacuum indirectly heated cathode tube but other types of tubes may be used. As disclosed, the tube VT is provided with a filament or heater 17, a cathode 18, an anode or plate 19, a screen grid 20, and a control grid 21. The tube VT is of conventional construction except the wire or element forming the control grid 21 has both ends thereof brought out of separate base or terminal pins which are indicated by the numerals 1 and 5. This construction permits a circuit to be established through the tube with the control grid 21 in series therewith. This construction of the control grid 21 may be accomplished in any suitable manner. For example, it may be accomplished by mounting the wire forming the control grid on an insulating member and connecting the two ends of the wire to terminal pins 1 and 5. The remaining elements of the tube VT are brought out to base pins in the usual construction, the filament 17 being connected to base pins 2 and 7, the cathode 18 to a base pin 8, the screen grid 20 to a base pin 4 and the anode 19 to a base pin 3.

The tube VT is designed for operation on a single 32 volt source of direct current, it being contemplated that the usual train lighting generator or battery will serve as a source of energy for the amplifying unit AM. In the drawings, the source of energy for the amplifying unit is indicated by the positive terminal B32 and the negative terminal C. It is to be understood, however, that the tube may be designed to use a power source of some other voltage and if desired the filament may be heated from a low voltage source and the anode and screen grid excited from a high voltage source. The filament or heater 17 of tube VT is connected directly across the terminals B32 and C, as will be apparent by an inspection of Fig. 1, and the tube is in an active condition. Two resistors R1 and R2 in series are also connected across the terminals B32 and C to form a voltage divider from which a bias voltage is obtained, as will appear shortly.

An anode circuit is formed for the tube VT by the anode 19 being connected to terminal B32 through a winding 22 of the coupling or master transformer MT and the cathode 18 of the tube being connected to the junction terminal of the resistors R1 and R2. The screen grid 20 is also connected to the positive terminal B32 of the power source.

The control grid 21 and its two terminals 1 and 5 are included in a circuit that is connected to the secondary winding 16 of the filter transformer T1, and the capacitor C2 through the capacitor C4 and resistor R3. This circuit extends from the top terminal of winding 16 as viewed in Fig. 1 with the capacitor C2 connected in multiple therewith, through capacitor C4, to terminal 1, control grid 21, terminal 5, resistor R3 and thence to the lower terminal of the secondary winding 16. This circuit is tuned to resonance at the carrier frequency of the signaling current and the two tuned circuits one including the primary winding 15 of transformer T1 and the capacitor C1 and the other including the secondary winding 16 of the transformer and the capacitor C2, form the input filter F1. The control grid 21 is connected to the cathode 18 through one path which extends from terminal 1 through capacitor C4, winding 16 of the transformer T1 and resistor R1. Furthermore, the terminal 5 of the control grid 21 is connected to the cathode through resistor R3 and biasing resistor R1. The parts are so proportioned that the negative bias voltage applied to the control grid from the resistor R1 is sufficient to bias the tube to substantially a zero anode current, this being the preferred arrangement although a bias of a different value may be provided.

The winding 22 of the coupling transformer MT is provided with a by-pass capacitor 23 and a secondary winding 24 of the transformer is connected to the operating winding of the code following relay MR. Relay MR is preferably a stick polar relay operable in response to a predetermined value of energization. The relay MR is provided with a contact member 25 which is operated in one direction to a first position when a current impulse of one polarity is supplied to the relay winding and the member 25 is operated in the other direction to a second position when the energizing impulse is of the opposite polarity. The contact member 25 is used to govern decoding and signaling means of any of the well-known arrangements, and which equipment is not shown for the sake of simplicity since it forms no part of my present invention and its showing is not required for a full understanding thereof. The decoding and signaling apparatus may be similar to that disclosed in Letters Patent of the United States No. 2,462,454, granted to me on February 22, 1949, for Train Carried Cab Signal Apparatus. It is sufficient for the present application to point out that code operation of the relay MR at the 180, 120, and 175 code rates effects a "clear," "approach medium," and "approach" cab signal indication, respectively. Also, when relay MR is deenergized and is not operated a "stop" or "slow speed" cab signal is effected.

In describing the operation of the apparatus of Fig. 1, I shall first consider that the tube VT is heated and that no signaling current is being supplied to the rails 1*a* and 1*b*. Under this condition the bias voltage derived from resistor R1 for the control grid 21 effects a substantially zero anode current. There being no variations in the anode current from its zero value, there will be no electromotive force induced in the secondary winding 24 of the master transformer MT and the relay MR is deenergized with the result that its contact member 25 remains at the position to which it was last moved. This non-operation of the relay MR creates the "stop" or "slow speed" cab signal. I shall next assume that alternating current coded at the 180 code rate is supplied to the rails 1*a* and 1*b* and a corresponding electromotive force is induced in the windings 11 and 12 of the inductor. This induced electromotive force is applied to the terminals TC and FT of the amplifying unit AM and a corresponding electromotive force is induced in secondary winding 16. The electromotive force thus induced in the secondary winding 16 is applied to the control grid circuit of the tube VT. Each positive half cycle of the electromotive force thus applied to the control grid 21 drives the grid 21 in the positive direction in opposition to the fixed bias voltage derived from resistor R1 and a current impulse flows in the anode circuit of the tube. Thus there is an increase in the average value of the anode current during each "on" code period of the coded carrier current and the anode current decreases to substantially zero during each "off" code period. The carrier variations of the anode current are by-passed by capacitor 23, but the code variations in the value of the anode current create corresponding impulses in secondary winding 24, the impulse being of one polarity when the current increases during the "on" code period, and being of the opposite polarity when the current decreases during the "off" code period. These impulses induced in secondary winding 24 are applied to the relay MR and the relay MR is operated at a rate corresponding to the 180 code rate of the rail current and in turn the relay effects a corresponding clear cab signal.

The operation of the apparatus of Fig. 1 when current of either the 120 or 75 code rate is supplied to the rails is the same as above described for current of 180 code rate except that the relay MR is operated at rates corresponding to the 120 and 75 code rates of the rail current and corresponding cab signal conditions are established.

It is apparent that electromotive forces picked up by the inductor IN due to alternating current of a frequency other than 100 cycles per second will be substantially suppressed due to the input filter F1. In other words, the amplifying unit is substantially immune to currents other than the 100 cycle signaling current.

I shall next consider open circuit conditions for the apparatus of Fig. 1 and the protection provided against false operation of the relay MR due to an open circuit condition when no signaling current is supplied to the rails. In the first place the screen grid 20 which is connected to the positive terminal B32, effects a higher degree of sensitivity for the tube than would prevail if a lower voltage is applied to the screen grid. Thus, an open circuit in the connection of the screen grid 20 results in a lower sensitivity for the amplifier tube and if there is a failure it will be that not enough energy is supplied to the relay MR for operation thereof in response to the rail current. With the relay MR not operated the "stop" or "slow speed" signal is created and which would be a more restrictive signal. That is, the failure, if any, due to an open circuit in the screen grid connection would be on the side of safety.

Again, it is clear that any open circuit in the anode circuit of the tube when no signaling energy is supplied to the rails will cause no electromotive force to be induced in winding 24 for energizing the relay MR because the anode current is normally of zero value.

Considering the effects resulting from an open circuit in the circuit associated with the control grid of the tube, should an open circuit condition occur in the portion of the control grid circuit including capacitor C4 and winding 16, the control grid is still connected to the cathode through the bias voltage source R1 and the resistor R3 and the negative bias voltage of the control grid is maintained with the result the anode current of the tube is held at its zero value. If the open circuit occurs in the resistance portion of the circuit, that is, in the path including resistor R3, then a charge is slowly built up on the capacitor C4 due to the voltage across resistor R1, the charging current flowing from the positive terminal of resistor R1 through cathode 18, tube space to control grid 21, capacitor C4 and winding 16 to the negative terminal of resistor R1. The potential drop between the cathode and the control grid due to the charging current helps to maintain the bias of the control grid until the capacitor C4 is charged to the voltage drop across the resistor R1. Thus, the loss of the bias on the control grid and the corresponding building up of the anode current are at a relatively slow rate and consequently no electromotive force or a very small electromotive force is induced in secondary winding 24 of the transformer MT and this small electromotive force is insufficient to operate the relay MR.

In Fig. 2, the circuits are the same as in Fig. 1 except the control grid circuit for the tube is modified by the resistor R3 being connected between the top terminal of the secondary winding 16 of the filter transformer and the terminal 5 of the tube. In this arrangement of Fig. 2, an open circuit in capacitor C4 leaves the negative bias voltage for the control grid 21 at its normal value due to the path through the winding 16 and resistor R3 to the terminal 5 of the tube. In the case of an open circuit condition in the resistor R3, the negative bias is retained until the capacitor C4 is charged by the voltage drop of resistor R1 through the tube space between the cathode and control grid and through the secondary winding 16 or through the capacitor C2. Thus in the circuits of Fig. 2 a false operation of the relay MR due to any intermittent open circuit condition of the circuits associated with the tube is avoided.

Although I have herein shown and described only two forms of vacuum tube amplifier circuits embodying my invention, it is to be understood that various changes and modifications may be made therein within the scope of the appended claims without departing from the spirit and scope of my invention.

Having thus described my invention, what I claim is:

1. In vacuum tube amplifier circuits, a vacuum tube provided with an anode, a cathode and a control electrode and having two external terminals which are connected to spaced points of the control electrode; an anode circuit including a power source connected to said anode and cathode to produce a current flow in the anode circuit as determined by voltages applied to said control electrode, a bias voltage source, a resistor, a capacitive element, a control electrode circuit including said bias voltage source and said resistor and said capacitive element connected to said two terminals of the control electrode and to said cathode, said bias voltage source poled to bias the control electrode negative in potential with respect to the cathode and of a voltage which produces substantially zero anode circuit current, said control electrode circuit arranged in such a manner that said resistor is interposed between one of said two terminals and the bias voltage source to retain said bias potential when an open circuit occurs in the capacitive element portion of the control electrode circuit and said capacitive element is interposed between the other one of said two terminals and the bias voltage source to effect a gradual loss of said bias potential and a gradual variation in the anode circuit current when an open circuit occurs in the resistor portion of the control electrode circuit.

2. In vacuum tube amplifier circuits; a vacuum tube provided with an anode, a cathode and a control grid and having two external terminals connected one to each end of the control grid; an anode circuit including a power source connected to said anode and cathode to produce a current flow in the anode circuit as governed by voltages applied to said control grid, a direct voltage bias source having its positive terminal connected to said cathode, a first circuit path including a resistor connected between the negative terminal of said bias voltage source and one of said two grid terminals to bais said grid negative in potential with respect to said cathode, said negative grid potential being sufficient to produce a substantially zero anode circuit current, a second circuit path including a capacitor connected between the negative terminal of said bias voltage source and to the other one of said two grid terminals to delay the loss of said negative grid bias potential when an open circuit occurs in said first circuit path.

3. In vacuum tube amplifier circuits; a vacuum tube having an anode, a cathode, and a control grid; said tube provided with two external terminals one connected to each end of said control grid, an anode circuit including a power source connected to said anode and cathode to produce a current flow in the anode circuit as determined by voltages applied to said control grid, a winding adapted to at times receive signaling energy, a capacitor, a resistor, a direct voltage bias source; a grid circuit including in series said winding, said capacitor, said control grid and its two terminals and said resistor; said bias voltage source having its positive terminal connected to said cathode and its negative terminal connected to said grid circuit at the junction of said resistor and said winding to bias the control grid negative in potential with respect to said cathode, said bias potential being retained through said resistor when an open circuit occurs in said winding or capacitor and the loss of said bias potential being made gradual due to the charging of said capacitor by the bias voltage source through the tube space when an open circuit occurs in said resistor.

4. In vacuum tube amplifier circuits; a vacuum tube having an anode, a cathode and a control grid; said tube provided with two external terminals one connected to each end of said control grid, an anode circuit including a power source connected to said anode and cathode to produce a current flow in the anode circuit as determined by voltages applied to said control grid, a winding adapted to at times receive signaling energy, a capacitor, a resistor, a direct voltage bias source; a first circuit path including in series said grid, a selected one of said two terminals, said capacitor, said winding, said bias voltage source and said cathode; a second circuit path including in series said grid, the other one of said two terminals, said resistor, said winding, said bias voltage source and said cathode; said bias voltage source poled to bias the control grid negative in potential with respect to said cathode, and said bias voltage being retained through said second circuit path when an open circuit occurs in said capacitor and the loss of the bias voltage being delayed by the charging of said capacitor by the bias voltage source through the tube space when an open circuit occurs in said resistor.

References Cited in the file of this patent

UNITED STATES PATENTS

| | | |
|---|---|---|
| 2,319,320 | Hepp | May 18, 1943 |
| 2,515,916 | Volz | July 18, 1950 |